June 16, 1925.
L. E. JONES
SIGNAL
Filed Sept. 30, 1921
1,542,555
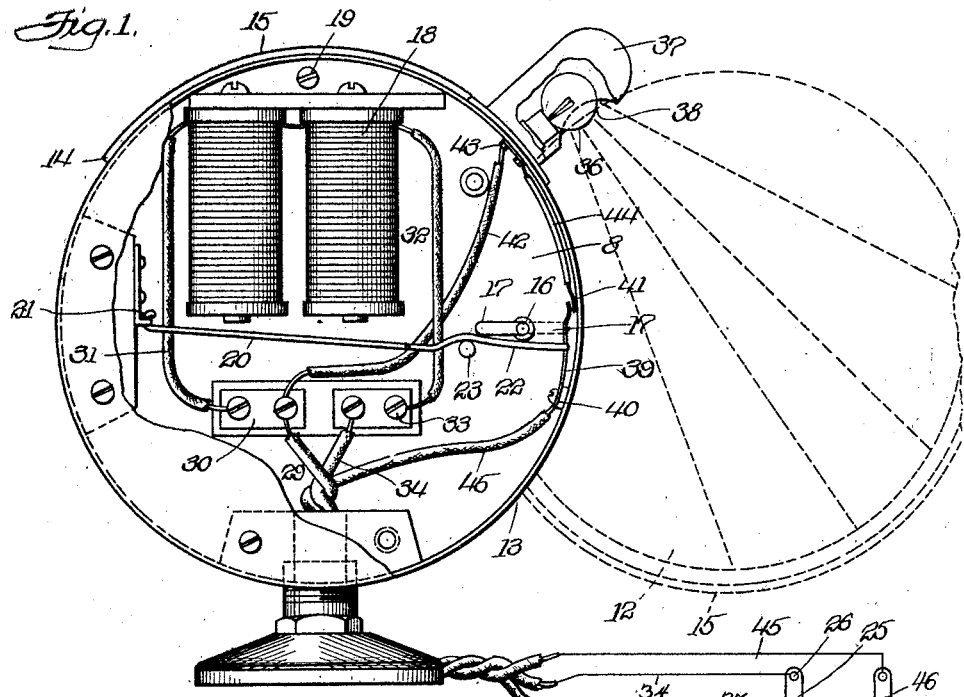
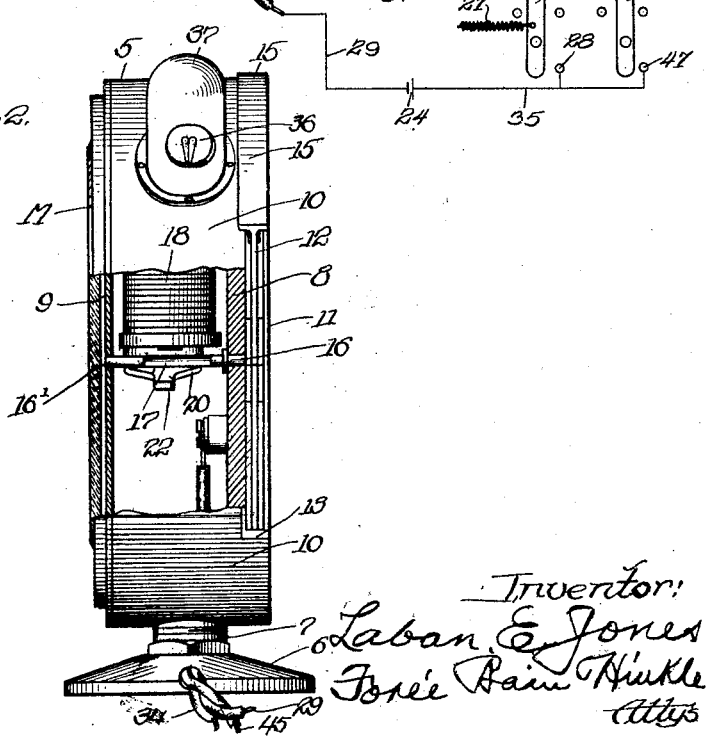

Patented June 16, 1925.

1,542,555

UNITED STATES PATENT OFFICE.

LABAN E. JONES, OF ANACONDA, MONTANA, ASSIGNOR OF ONE-HALF TO MICHAEL L. McDERMOTT, OF ANACONDA, MONTANA.

SIGNAL.

Application filed September 30, 1921. Serial No. 504,333.

*To all whom it may concern:*

Be it known that I, LABAN E. JONES, a citizen of the United States, residing at Anaconda, in the county of Deer Lodge and State of Montana, have invented certain new and useful Improvements in Signals, of which the following is a specification.

The invention relates to improvements in signals, and has especial reference to controlling means for operating signals from a remote point.

One of the objects of the invention is to provide an improved signal device and means for its control.

Another object is to provide an improved direction-indicating signal for automobiles and like vehicles.

Another object is to provide an improved signal casing with an attached mirror so that the driver of the vehicle carrying the signal can conveniently observe the approach of a vehicle in the rear.

Another object is to provide a semaphoric signal, normally concealed and a light operated by movement of the semaphore to illuminate the face thereof, so that the semaphore may be clearly discernible after dark.

Another object of the invention is the provision of a shield for the light to render the direct rays therefrom unobservable by either driver.

Other, further and more specific objects and advantages of the invention will become readily apparent, to persons skilled in the art, from a consideration of the following description when taken in conjunction with the drawings, wherein:—

Fig. 1 shows the casing with the semaphore arm or disk obscured thereby, or out of sight, and showing the semaphore in dotted lines, as it will appear when extended therefrom, also showing the circuit controlling the semaphore and the light which illuminates the face thereof.

Fig. 2 is an end elevation showing parts in section.

In both views the same reference characters are employed to indicate similar parts.

The casing 5, in the example shown, is substantially cylindrical, mounted on a base 6 and secured thereto by the nipple 7. The device is especially adapted for and well designed to be placed upon the front mud guards, one on each, of an ordinary automobile to which it may be secured by screws passing thru the base 6. The part of the casing facing the driver of the automobile upon which the device is placed, carries a mirror M, so inclined that from the driver's seat he will be able to see the roadway behind him and all vehicles that approach from the rear.

The casing 5 carries an end wall 8 and another end wall 9, with a rim or cylindrical wall 10, extending around the full circumference of the walls 8 and 9. There is another end wall 11 which is spaced away from the wall 8 and held in spaced relation by suitable means and, between the walls 8 and 11, the semaphore arm or disk 12 is normally contained. The rim 10 closes the space between the walls 8 and 11 from the point 13 to a point 14 and extends over the lower half of the casing. The semaphore arm 12 is provided with a rim 15 which normally closes the space left by the wall 10 between the walls 8 and 11 when the semaphore arm is within the casing. The semaphore arm 12 is pivoted in the walls 8 and 9 on a shaft 16 and 16'. There is an intervening lateral projection which may well be a crank arm 17. The stops 13 and 14 for the semaphore 12, prevent the lateral projection or crank arm 17 from rotating more than one-half a revolution or 180 degrees. If pressure be applied to the projection 17 as shown in full lines in Fig. 1, to move it upwardly, and if that pressure be characterized as an impulse or blow, the projection 17 will be rotated one-half revolution into the position shown in dotted lines in Fig. 1 and the semaphore 12 will thereby be moved out of the casing into dotted line position. Now, if another impulse be applied to move the projection upwardly, in its new position, it will thereby be returned to its former position and the semaphore arm 12 will be returned to the casing or within the space between the walls 8 and 11 constituting part of the casing.

A convenient manner of moving the semaphore consists of an electromagnet 18 which is shown to be secured in the casing by a screw 19, and which is provided with an armature 20 pivoted to the casing, as at 21. The armature 20 has an extended free end 22 which lies under the projection 17, shown as a crank, in whatever position it may be placed, as limited by movement of the semaphore and the stops 13 and 14.

The stop 23 prevents the armature 20 from moving downwardly beyond its normal position in either position of the projection 17. When the electromagnet is energized by an electric current the armature 20 is attracted; the outer end 22 is raised against the crank arm 17 which is given a sudden impulsive blow which causes it to make one-half of a revolution, as heretofore described, and therewith the semaphore is moved outwardly of the casing or inwardly, in accordance with the position of the crank arm at the time the blow is struck.

The energizing of the electromagnet 18 may be accomplished by any suitable source of electric current such as a battery graphically represented, as at 24, and a push-button switch, consisting of a bar 25 pivoted at 26 and normally restrained by a spring 27. When the switch arm 25 makes electrical connection with the contact 28, an impulse of electricity from the battery 24 it will pass over the wire 29 to the contact plate 30 within the casing, over the wire 31 to the electromagnet coils of the electromagnet 18, and from thence by wire 32 to the plate 33, then back over wire 34 to the switch blade 25, and from thence to the contact 28 and wire 35, thus completing the electric circuit and producing an impulse of electricity in the electromagnet causing the armature 20 to be raised and the semaphore to be shifted, in the manner heretofore described. It is not necessary that the circuit should remain closed in order that the impulse should perform the desired work intended of it in shifting the semaphore and, therefore, current is economized and the battery is not injured by protracted use. The semaphore will remain in its position in which it has been placed by a single impulse of current of short duration.

A refinement of the invention consists of the lamp 36 provided with a covering cowl 37 which has an opening 38 which protects the eyes of the observer and causes the light to shine directly upon the semaphore 12. A spring switch blade 39 is secured to an insulating block, as at 40, and extends over a fixed contact blade 41. When the arm 17 is moved outwardly, as shown in dotted line position in Fig. 1, the spring blade 39 of the lamp switch is pushed into contact with the electrical connection with the contact 41, after which circuit is completed from the battery 24 over the wire 29 to the plate 30, over the wire 42, to the lamp terminal 43, and thru the lamp over the wire 44 into contact blade 41, then thru the switch blade 39 to the contact 40, over the wire 45 to the switch blade 46, which is now closed on the contact 47, and the lamp 36 is thereby energized and the semaphore arm illuminated as when it is desired that the arm should be clearly seen from a distance during the darkness of night. When it is desired that the light should not be used the switch 46 may be opened as shown in the diagram in Fig. 1. The lamp is not affected by the switch 25 nor the circuit leading thru the electromagnet 18, but the lamp 36 will remain energized and illuminate the semaphore arm so long as the arm is exposed, but will become extinguished when the arm is moved back into the casing and the crank arm 17 has been returned to the position shown in full lines in Fig. 1, because at that time the spring switch arm 39 will automatically leave the contact 41, the circuit thru the lamp will thereby be opened.

While I have herein stated that the devices may be located upon the front mud guards so as to take advantage of the use of the mirrors, it will, of course, be realized that they may fully as well be placed on the rear mud guards and the mirrors dispensed with. This is a refinement that may or may not be used just as the lamp 36 may be used or not as may be desired.

While I have herein shown a single embodiment of my invention for the purpose of clear disclosure, it will be further manifest that many changes in the general arrangement and configuration of the parts may be made within the scope of the appended claims. It is also apparent that projection 17 need not necesarily take the form as a crank arm, as any other form of arm or projection may be made to serve the purpose.

Having described my invention what I claim as new and desire to secure by Letters Patent, is:—

1. A signal device providing a casing, an oscillatable shaft passing through the casing and having a laterally projecting arm therein; a semaphore arm pivoted to the casing by the shaft; means to limit the movement of said arm; an electromagnet within the casing; an armature responsive to the magnet and having its free end adjacent to the arm in a position to contact the arm in either of its positions, whereby to oscillate said shaft in both directions by an impulse imparted by the armature to the arm when the magnet is energized to alternately obscure and exhibit the semaphore.

2. A signal devise providing a casing; an oscillatable shaft passing thru the casing and having a laterally projecting arm therein; a semaphore arm pivoted to the casing by the shaft; means to limit the movement of said shaft arm; an electromagnet within the casing; an armature, responsive to the magnet, pivoted at one end and having its free end adjacent to the shaft arm in either of the latter's positions whereby to oscillate said shaft by an impulse imparted to the arm by the armature when the magnet is energized to, alternatively, obscure and expose said semaphore.

3. A device of the character described comprising an oscillatable shaft adapted to be moved into two positions providing a crank arm; means limiting its movement to substantially one half of one revolution; an armature pivoted at one end and free at its remote end, said remote end adjacent said crank arm in either of its positions; an electromagnet to energize said armature, whereby successive impulses of the armature will rotate the shaft to its respective positions.

4. A signal device comprising a cylindrical casing; a semaphoric disc normally obscured by the casing; an oscillatable shaft, upon which the disk is mounted, passing into the casing and having a projection extending laterally therefrom; means to limit oscillatable movement of said projection and shaft to substantially one-half of one revolution; an armature pivoted at one end having its free end adjacent said projection in both positions of its movement; an electromagnet for imparting a movement impulse to the armature when energized, whereby to oscillate the shaft and disk by its engagement with the armature, to display and to obscure said disk.

In testimony whereof I hereunto subscribed my name.

LABAN E. JONES.